(12) United States Patent
Krauth et al.

(10) Patent No.: US 9,236,783 B2
(45) Date of Patent: Jan. 12, 2016

(54) ELECTRICAL MACHINE

(75) Inventors: Wolfgang Krauth, Achern-Sasbachried (DE); Tilo Koenig, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 740 days.

(21) Appl. No.: 13/257,335

(22) PCT Filed: Jan. 21, 2010

(86) PCT No.: PCT/EP2010/050659
§ 371 (c)(1),
(2), (4) Date: Dec. 5, 2011

(87) PCT Pub. No.: WO2010/105866
PCT Pub. Date: Sep. 23, 2010

(65) Prior Publication Data
US 2012/0091852 A1   Apr. 19, 2012

(30) Foreign Application Priority Data
Mar. 19, 2009   (DE) .......................... 10 2009 001 650

(51) Int. Cl.
*H02K 1/12*   (2006.01)
*H02K 1/18*   (2006.01)
(Continued)

(52) U.S. Cl.
CPC ................ *H02K 15/026* (2013.01); *H02K 1/12* (2013.01); *H02K 1/22* (2013.01); *Y10T 29/49009* (2015.01); *Y10T 29/49012* (2015.01)

(58) Field of Classification Search
CPC ............. H02K 1/06; H02K 1/12; H02K 1/17; H02K 1/18; H02K 1/185; H02K 1/187; H02K 1/27; H02K 1/28; H02K 1/30; H02K 3/47; H02K 15/061; H02K 15/12; H02K 15/125; H02K 5/04; H02K 5/06; H02K 5/08; H02K 5/10; H02K 1/2786; H02K 15/02; H02K 1/2793; H02K 15/26; H02K 15/28
USPC .................... 310/216.002, 216.003, 216.041, 310/216.04–216.044, 400, 402, 406–409, 310/418, 428, 216.131, 216.134
See application file for complete search history.

(56) References Cited

U.S. PATENT DOCUMENTS 2,417,195 A * 3/1947 Hargreaves ............ 310/216.124
2,834,895 A * 5/1958 Papst ............................... 310/44
(Continued)

FOREIGN PATENT DOCUMENTS

| CN | 1756029 | 4/2006 |
|---|---|---|
| CN | 101098090 | 1/2008 |

(Continued)

OTHER PUBLICATIONS

Takehara et al., JP2003189509 Machine Translation, Jul. 2003.*
(Continued)

*Primary Examiner* — Quyen Leung
*Assistant Examiner* — Eric Johnson
(74) *Attorney, Agent, or Firm* — Michael Best & Friedrich LLP

(57) ABSTRACT

The invention relates to an electric machine, comprising a rotor (8; 50; 76) and a stator (9; 29; 77), wherein the rotor (8; 50; 76) and/or the stator (9; 29; 77) comprise at least one laminated core (2; 11; 32; 72) having a substantially rectangular cross-section, wherein the laminated core (2; 11; 32; 72) comprises a sheet metal strip (1), wherein the sheet metal strip (1) is wound in a coil shape.

13 Claims, 4 Drawing Sheets

(51) Int. Cl.
*H02K 15/02* (2006.01)
*H02K 1/22* (2006.01)

(56) References Cited

U.S. PATENT DOCUMENTS

| | | | | |
|---|---|---|---|---|
| 5,313,131 | A * | 5/1994 | Hibino et al. | 310/216.002 |
| 5,396,138 | A * | 3/1995 | Steiner | 310/216.002 |
| 5,945,751 | A * | 8/1999 | Hans et al. | 310/67 R |
| 6,737,780 | B1 * | 5/2004 | Fisher et al. | 310/154.03 |
| 6,864,609 | B2 * | 3/2005 | Fisher et al. | 310/154.08 |
| 2010/0170690 | A1 | 7/2010 | Rieker et al. | |

FOREIGN PATENT DOCUMENTS

| | | | | |
|---|---|---|---|---|
| DE | 19947119 A1 | 5/2001 | | |
| DE | 102007029739 | 1/2009 | | |
| FR | 1598097 A | 6/1970 | | |
| JP | 49-80334 | 7/1974 | | |
| JP | 53051405 A * | 5/1978 | | H02K 15/02 |
| JP | 56-80639 | 6/1981 | | |
| JP | 60016159 A | 1/1985 | | |
| JP | 62277038 | 12/1987 | | |
| JP | 06133520 A * | 5/1994 | | H02K 29/00 |
| JP | 2000152524 | 5/2000 | | |
| JP | 2002034189 | 1/2002 | | |
| JP | 2003189509 | 7/2003 | | |
| JP | 2005110454 | 4/2005 | | |
| WO | 9202068 | 2/1992 | | |
| WO | WO 2007113057 A1 * | 10/2007 | | H02K 1/27 |

OTHER PUBLICATIONS

Tsuruta et al., JP06133520 Machine Translation, May 1994.*
PCT/EP2010/050659 International Search Report.

* cited by examiner

ELECTRICAL MACHINE

BACKGROUND OF THE INVENTION

The invention relates to an electrical machine having a housing containing a rotor and a stator, with the rotor and/or the stator having at least one laminated core with a substantially rectangular cross section.

Iron cores are used in a very wide variety of types of electrical machines for conducting the magnetic flux with a low level of loss. In this case, inductively generated eddy currents, which lead to heating of the electrical machine and furthermore cannot be used, are produced under the influence of an alternating electrical field in iron cores comprising solid material. In order to minimize this, iron cores for electrical machines are preferably formed from metal sheets which are electrically insulated from one another or as cut strip-wound cores. In this case, the insulated metal sheets are either constructed as individual, loose metal sheets, also called laminations, or as an interconnected laminated core, also called stack of laminations, during assembly of the electrical machine.

As a result of the development of brushless DC motors with an air gap winding, the basic shape of the laminated cores with pole shoes has developed to form annular laminated cores which form a hollow-cylindrical body when they are stacked. These designs of laminated cores are used, for example, in electrical machines as disclosed by DE 10 2007 029 739 A1.

In order to produce the laminated cores, the individual metal sheets are punched out of a sheet metal strip, layered to form a laminated core and connected to one another. In this case, the metal sheets can be connected, inter alia, by baked enamel, punch-stacking or by a weld connection. A high proportion of waste is created particularly when punching metal sheets which produce a hollow cylinder when layered. In order to produce the laminated cores, the sheet metal part of the laminated core is punched out of a sheet metal strip with a width which is a few millimeters greater than the outside diameter of the sheet metal part which is to be punched. When the sheet metal part is punched out, both the inner part of the sheet metal part and the outer part of the sheet metal part, that is the remains of the sheet metal strip, are wasted. Therefore, in order to produce a laminated core with a weight of approximately 190 g with an outside diameter of 68 mm and an inside diameter of 64 mm and a thickness of 0.7 mm, approximately 2.2 kg of sheet metal are required in order to be able to produce the laminated core. This corresponds to over 90% waste.

In order to reduce waste, cut strip-wound cores are used in the case of transformers. To this end, a sheet metal strip is wound onto a mandrel with a rectangular cross section and adhesively bonded. The wound, adhesively bonded laminated core is then divided centrally parallel to the longitudinal axis of the laminated core and the separating surfaces are polished. Wound coils are inserted into the halves and adhesively bonded. As a result of the division of the cut strip-wound core in order to release it from the mandrel, two thin air gaps are produced when the two cut strip-wound core halves are joined to one another, said air gaps influencing the magnetic flux between the two cut strip-wound core halves. On account of the two-part design of the cut strip-wound core, said cut strip-wound core is particularly unsuitable for use in rotating electrical machines. The cut strip-wound core is primarily unsuitable for use on the rotor since the metal sheets are exposed to high centrifugal forces here. The air gap and the polishing steps required to minimize the air gap do not favor use on the stator. Therefore, laminated cores in which the individual metal sheets are produced by means of punching from a sheet metal strip are primarily used in electrical machines with a rotor and/or a stator.

SUMMARY OF THE INVENTION

The object of the invention is therefore to provide a laminated core for an electrical machine, in which waste is minimized during production of the laminated core, it being possible to produce said laminated core in a simple manner, to mount said laminated core in the electrical machine and to use said laminated core both on the stator and on the rotor of an electrical machine.

According to the invention, it has been identified that a high proportion of material being wasted can be avoided during production of a laminated core with a rectangular cross section of a rotor and/or a stator of an electrical machine by the laminated core having a continuous sheet metal strip which forms a hollow-cylindrical body when wound in the form of a coil. In this way, the material weight used can be reduced by approximately one order of magnitude compared to the punching method used. Furthermore, the sheet metal strip which is wound in the form of a coil facilitates mounting in the rotor or stator.

In a further embodiment of the invention, the electrical machine has a support on the stator and/or on the rotor, said support having at least one receptacle, and with the prestress of the wound sheet metal strip of the laminated core being set such that the laminated core is arranged in the receptacle of the support of the stator and/or of the rotor without play. This has the advantage that the laminated core is automatically matched to the manufacturing dimensions of the support.

In a further embodiment of the invention, the sheet metal strip of the laminated core is connected in the axial direction at least partially by means of baked enamel or by means of a weld connection. In this way, the moving and flexible laminated core can be fused and/or welded to form a strong structure.

In a further embodiment of the invention, the sheet metal strip of the laminated core comprises a soft-magnetic material. The magnetic flux can be conducted in this way.

BRIEF DESCRIPTION OF THE DRAWINGS

The invention will be explained in greater detail below with reference to figures in which.

DETAILED DESCRIPTION

Laminated cores 2 for electrical machines are usually produced by means of punching. In the process, a high proportion of material is wasted when producing hollow-cylindrical shapes. In order to make production more resource-friendly, the laminated core 2 has been wound in the form of a coil from a sheet metal strip 1 according to the invention.

Figure 1:
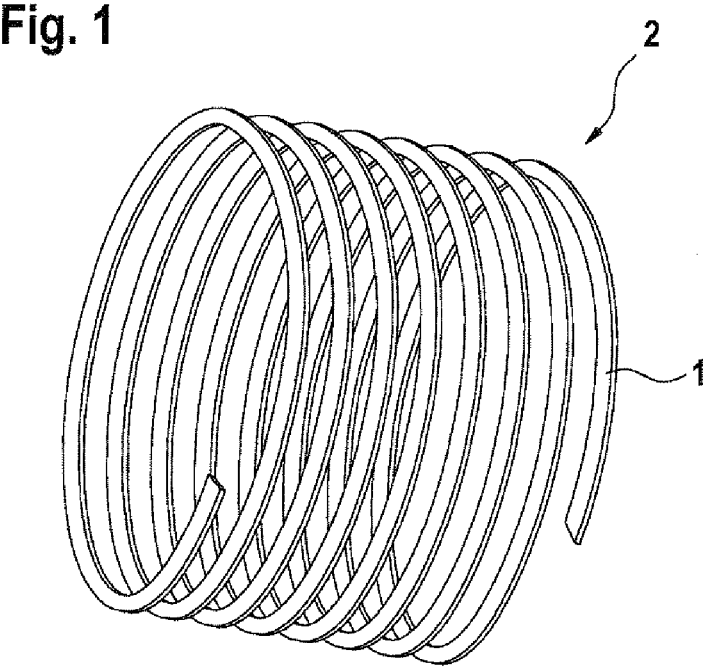
FIG. 1 shows a perspective view of a wound sheet metal strip of the laminated core in an extended, stressed state.
Figure 2:
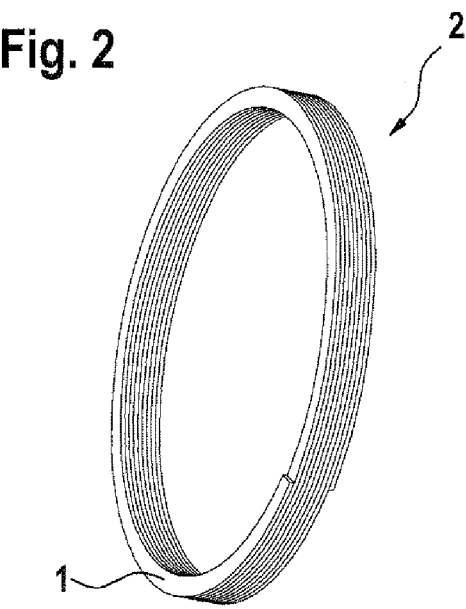
FIG. 2 shows a perspective view of the wound sheet metal strip of the laminated core from FIG. 1 in a relaxed state

FIGS. 1 and 2 are perspective illustrations of a wound sheet metal strip 1 of a laminated core 2 for an electrical machine. In this case, the laminated core 2 is illustrated in an expanded, stressed state in FIG. 1. In FIG. 2, the laminated core 2 is illustrated in a relaxed state.

The laminated core 2 can be produced by means of edge-rolling. In this case, a sheet metal strip 1 is wound on edge around a mandrel which has a circular cross section. In this case, the number of windings corresponds to the conventionally used number of layers of metal sheets in the laminated core 2. After the mandrel is removed, the integral laminated core 2 has a hollow-cylindrical basic shape. On account of the integral design, the laminated core 2 can be kept ready for production in a prefabricated state.

The sheet metal strip 1 for winding the laminated core 2 has a rectangular cross section, it being possible for the sheet metal strip 1 to have both sharp and rounded edges. The sheet metal strip 1 has soft-magnetic properties, with the sheet metal strip 1 comprising a material which comprises silicon and/or iron. The material of the sheet metal strip corresponds, for example, approximately to the materials disclosed in DIN EN 10106: 1996-02 for cold-rolled non-grain-oriented magnetic steel sheet and strip in the finally-annealed state or DIN EN 10107: 2005-10 for grain-oriented magnetic steel sheet and strip in the finally-annealed state. The sheet metal strip 1 of the laminated core 2 can also be manufactured from a flat wire, the material RSI 24 according to DIN 17405 being in particular suitable for producing the laminated core 2 from a flat wire. In this case, the sheet metal strip 1 can have an additional coating in order to influence the sheet metal strip 1 in respect of corrosion protection, insulation, thermal flow, heat resistance or weldability. Particularly suitable coating materials include plastics, for example synthetic resins, or baked enamel and also inorganic compounds. The applied layer thickness is selected by a person skilled in the art depending on the intended use of the sheet metal strip 1 of the laminated core 2. In this way, the individual turns of the sheet metal strip 1 can be insulated from one another, so that eddy currents cannot propagate over the contact areas of the sheet metal strip 1.

In respect of assembly of the laminated core 2, the wound sheet metal strip 1 provides the possibility of increasing the size of the inside diameter of the laminated core 2 by twisting one end about the longitudinal axis of the laminated core 2 in relation to the other end about the longitudinal axis of the laminated core 2, as illustrated in FIG. 1. Analogously, the outside diameter of the laminated core 2 can also be reduced in size. This has the advantage that the laminated core 2 can be introduced into a receptacle in a prestressed, expanded state. In this case, the receptacle can have a cylindrical basic shape, but also be designed to be in the form of a barrel or in a rotationally symmetrical manner. The seating of the laminated core 2 in the receptacle is fixed by relaxing the laminated core 2. In this case, the laminated core 2 rests against the contour of the receptacle. Similarly, the outside diameter of the laminated core 2 can be reduced in order to introduce the laminated core 2 into a rotationally symmetrical body on the inside of the receptacle, with the outside diameter expanding due to relaxing and the laminated core 2 thus resting by way of its outer faces against the inner contour of the receptacle. The laminated core 2 can be inserted into the receptacle without play by virtue of suitable selection of the inside diameter and, respectively, of the outside diameter of the wound sheet metal strip 1 of the laminated core 2. This has the advantage that the laminated core 2 is automatically matched to the manufacturing tolerances of the receptacle.

Figure 3:
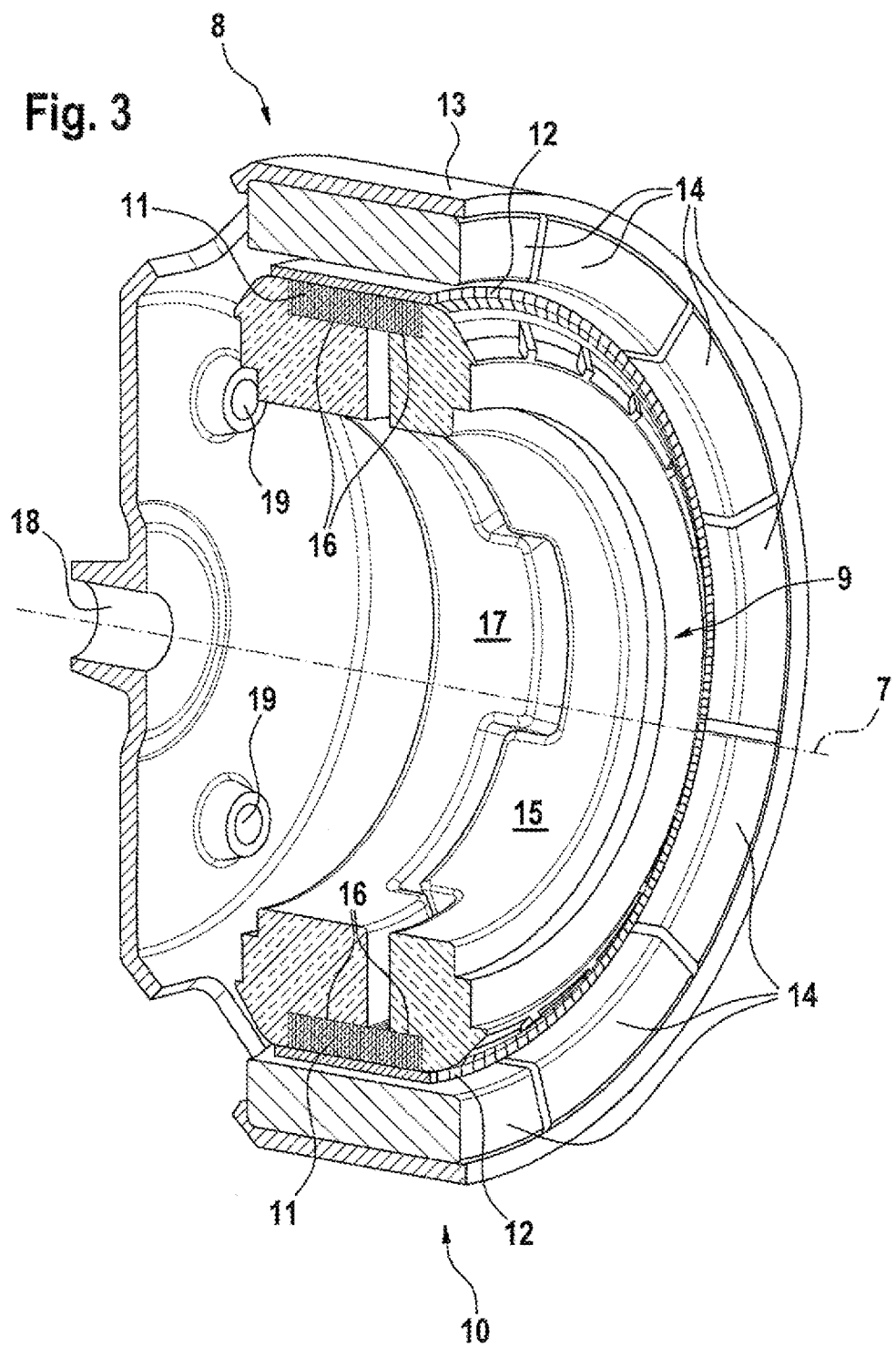
FIG. 3 is a schematic 3D illustration of a first embodiment of an electrical machine according to the invention.

FIG. 3 is a schematic 3D illustration of an electrical machine according to a first embodiment. The electrical machine, which is illustrated in a three-dimensional half-section, is designed as a brushless DC machine which has a rotor 8 which, as an external rotor 10, at least partially surrounds a stator 9. The rotor 8 has a bell 13 with a central opening 18 for receiving a shaft (not illustrated) which lies on the rotation axis 7. Fastening openings 19 are provided in the bell for the purpose of transmitting the generated torque of the external rotor 10, said fastening openings ideally being arranged concentrically about the rotor axis 7. Three fastening openings 19 with an angular offset of 120° are provided around the rotation axis 7 in the illustrated exemplary embodiment, said fastening openings having conical reinforcements at their side faces, said reinforcements projecting into the space in the bell 13 of the rotor 8.

The magnets 14 are arranged on the inside over the circumferential surfaces of the cylindrical inner contour of the bell 13 of the rotor 8. By way of example, twelve magnets 14 are arranged concentrically around the rotor axis 7 in the illustrated exemplary embodiment of the rotor 8, with only seven being at least partially illustrated on account of the illustration being of a half-section. The magnets are generally fixed by adhesive bonding, clamping, clipping, encapsulation or by a combination of these.

The stator 9 has, as a support, a first insulating mask 15 and a second insulating mask 17, with the two insulating masks 15, 17 having recesses and raised portions. The raised portions and recesses alternate at a regular angle over the course of the side faces of the insulating masks and are located on the respectively opposite side faces of the two insulating masks 15, 17. The recesses and raised portions are formed such that in each case one raised portion of the first insulating mask 15 engages in the opposite recess of the second insulating mask 17. The recesses and the raised portions allow flexible adaptation of the support to the density of a laminated core 11. The inside of the stator 9 is not illustrated and said stator is fixed, for example to a vehicle, by a fastening part on the right-hand side of the illustration. In this case, the design of the electrical machine which is described in the embodiment is suitable, for example, as a fan motor, in which the fan impeller is fixed directly on the bell 13 of the rotor 8.

In order to assemble a customarily used laminated core which is composed of a plurality of individual punched metal sheets, the first insulating mask 15 has to be separated from the second insulating mask 17 for the purpose of installing the laminated core, in order to line up the individual metal sheets of the laminated core on the first insulating mask 15 or the second insulating mask 17. After the metal sheets of the laminated core are lined up on one of the insulating masks 15, 17, the opposite insulating mask can be pushed onto the other insulating mask again. Disadvantages of the assembly of the laminated core include, in particular, individual threading of the metal sheets onto the insulating masks 15, 17 and the high requirement for resources for producing the individual annular metal sheets from a sheet metal strip.

Similarly to the laminated core 2 in FIG. 1 and FIG. 2, the laminated core 11 is integrally produced from a sheet metal strip which is wound around a mandrel. The laminated core 11 can be fitted onto one of the separated insulating masks 15, 17 in a similar manner to the laminated core 11 which comprises individual metal sheets. However, it is also possible to widen the inside diameter of the laminated core 11 by twisting one end of the laminated core 11 in relation to the other end of the laminated core 11 about the longitudinal axis of the laminated core 11 and to prestress the laminated core 11. As a result, the laminated core 11 can be pushed over the maximum dimensions of the insulating masks 15, 17. In a position pushed over the receptacle 16, the laminated core 11 can be introduced into the receptacle 16 by relaxing the laminated core 11, and therefore by reducing the inside diameter of said laminated core 11.

On account of the integral design of the laminated core 11, the laminated core 11 lengthens when it is stressed such that the outside diameter of the laminated core 11 is reduced, and shortens when the inside diameter is widened. In both cases, the laminated core 11 returns to the original shape in the event of tensioning in the elastic region of the material of the laminated core 11 and adapts to the receptacle without play. In this way, the laminated core 11 can be introduced into the receptacle 16 of the insulating masks 15, 17 more easily than individual metal sheets.

After the laminated core 11 is introduced into the support, the stator 9 can be wound. The laminated core 11 serves as a magnetic return path for the winding 12 which is designed as an air gap winding. Motors with an air gap winding advantageously have a very low cogging torque on account of pole shoes being dispensed with. The illustrated conduction regions of the winding 12 are connected to one another and wired up such that a magnetic alternating field is built up by power being supplied by means of alternating current, said magnetic alternating field causing the rotor 8, which is provided with magnets 14, to rotate.

After the laminated core 11 is mounted, the laminated core can be heated together with the support and possibly with the mounted windings 12 in order to bake the flexible laminated core 11 by means of baked enamel so as to form a solid component. It would likewise be feasible to at least partially fix the laminated core by means of a weld connection.

Figure 4:
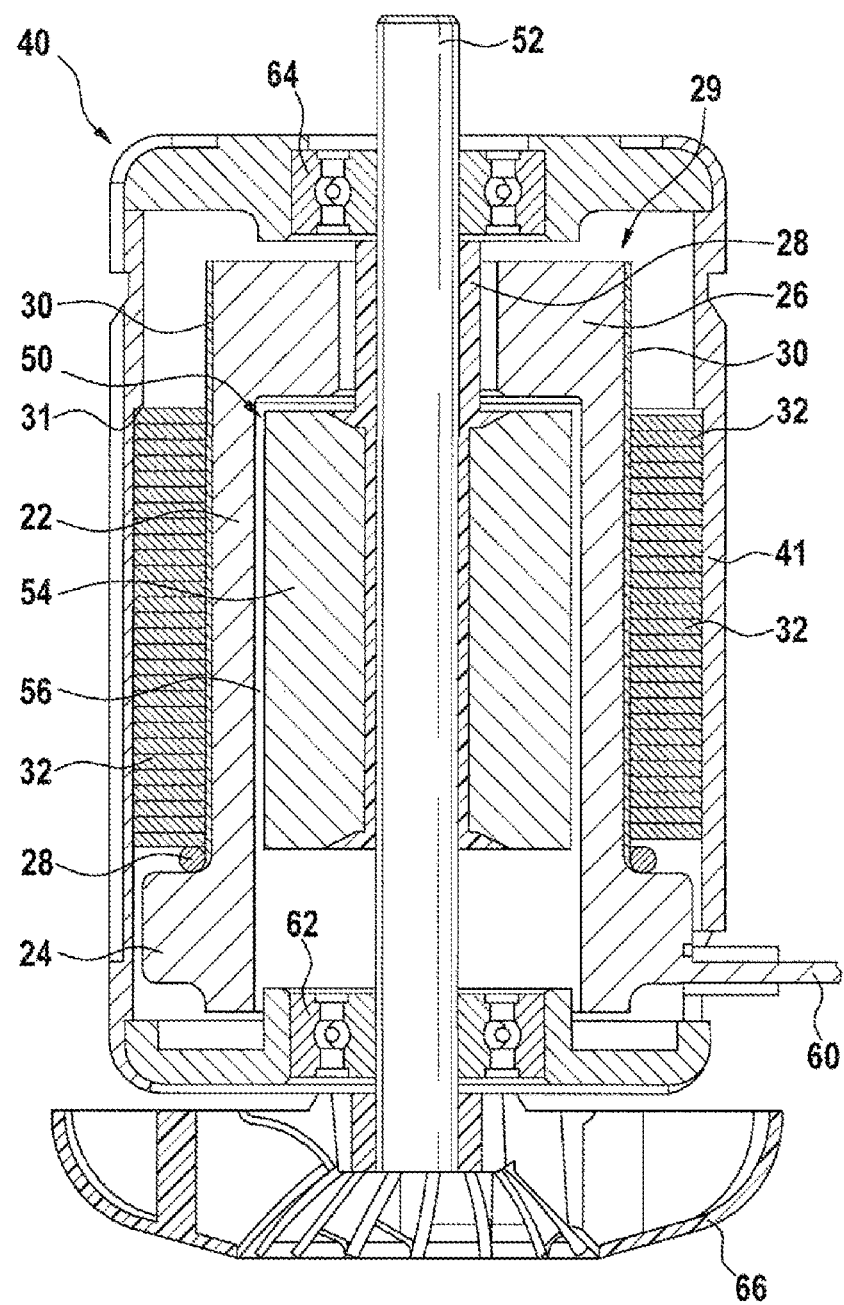
FIG. 4 is a schematic 3D illustration of a second embodiment of an electrical machine according to the invention.

FIG. 4 shows a longitudinal section through an electrical machine 40 having a stator 29, which is arranged in a housing 41, and a rotor 50, which is arranged as an internal rotor. The rotor has a rotor shaft 52 on which at least one permanent magnet 54 is arranged. The rotor shaft 52 is mounted by a first bearing 64 and a second bearing 62. The bearings 62, 64 are designed as roller bearings in the embodiment but sliding bearings would also be feasible. An air gap 56 is formed between an outer circumference of the rotor 50 and an inner contour of a winding former 22 of the stator 29 of the electrical machine 40. An insulating means 30 is mounted on the outer circumference of the winding former 22, a laminated core 32 being arranged on said insulating means. In this case, the laminated core 32 comprises a wound sheet metal strip and replaces the sheet metal rings which are usually layered in the axial direction. The illustrated laminated core 32 is produced in a similar way to the laminated core 2 which is shown in FIGS. 1 and 2. The individual rectangular layers of the laminated core 2 are axially displaced by the winding of the sheet metal strip. As a result, relatively small cavities can form in the region of the fastening points at the upper and lower ends of the laminated core 32. In this case, the laminated core 32 is seated on a winding former 22, the windings of said winding former comprising a large number of enameled copper wires which are shaped in a suitable manner.

The winding former 22 has an axial expansion in the form of a winding head 24 at its end which is at the bottom in the illustration, said winding head having approximately an outside diameter which corresponds to the outside diameter of the laminated core 32. The winding former 22 is molded radially inwardly at the opposite end 26 of the winding former 22, so that the winding head 24 surrounds the permanent magnets 54 on the rotor shaft 52 in a bell-like manner with a thickened lower edge. The winding former 22 or its winding lines (not illustrated) can be supplied with power via an electrical connection 60 on the winding head 24.

A fixing ring 28 is arranged between the laminated core 32 and the winding head 24 of the winding former 22 such that said fixing ring fits closely to the radius of the main body and of the winding former 24. In this case, the fixing ring 28 additionally lies on the insulating means 30. The laminated core 32 is held in its position in the housing 41 of the electrical machine 40 by means of a projection 31 and by means of the fixing ring 28. In this case, the winding former 22 is fixed to points (not illustrated) in the housing 41. The electrical machine 40 has, at one end of the rotor shaft, a flange 66 in order to transmit the power of the electrical machine to a further assembly (not illustrated).

Figure 5:
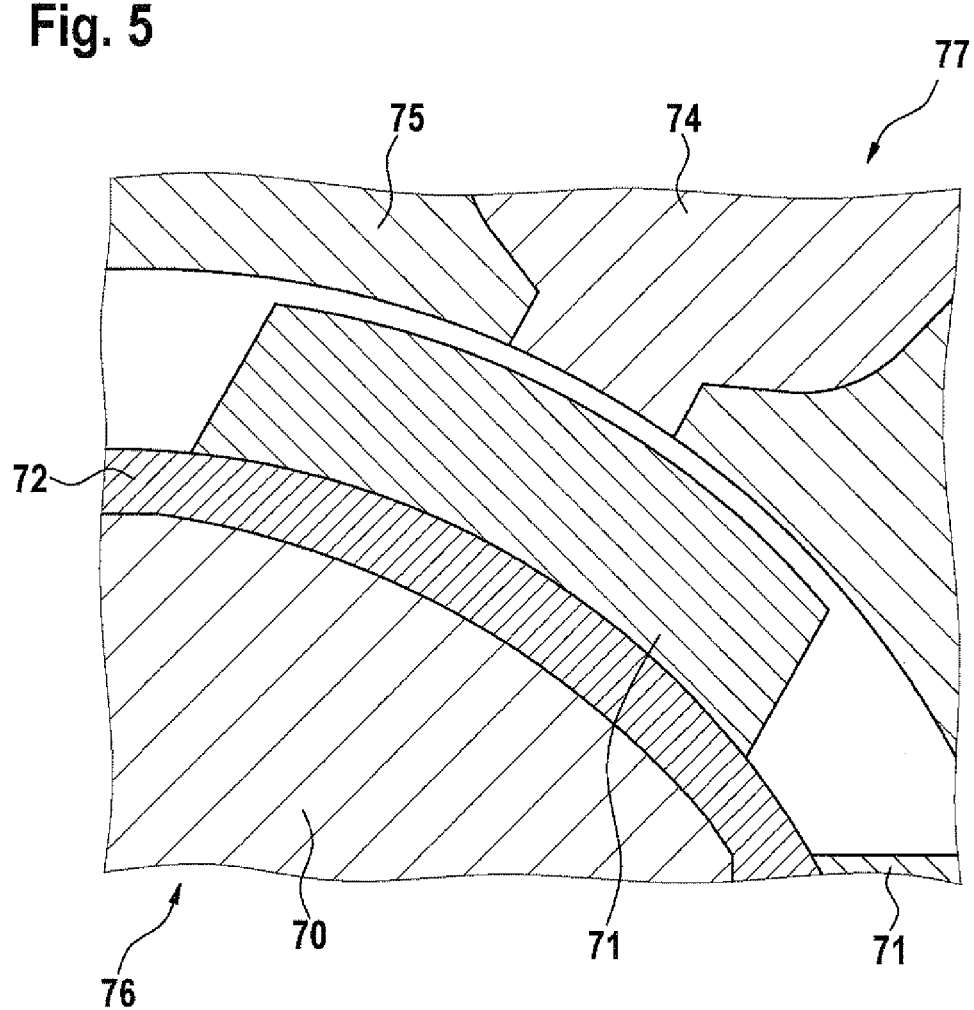
FIG. 5 shows a detail of a section through an electrical machine according to a third embodiment of the invention.

FIG. 5 shows a cross section through an electrical machine according to a third embodiment of the invention. In this case, the electrical machine comprises a rotor 76 and a stator 77. In the embodiment, the rotor 76 is designed as an internal rotor and the stator 77 has a typical pole shoe construction. The rotor 76 has a support 70 which is arranged on a rotor shaft (not illustrated). The support 70 is radially surrounded by a laminated core 72. The laminated core 72 is produced from a sheet metal strip 72 which is wound around a mandrel in a similar way to the laminated core 2 from FIGS. 1 and 2. The sheet metal strip can also comprise flat wire. The laminated core 72 can be stressed by twisting one end of the laminated core 72 about the longitudinal axis of the laminated core 72 in relation to the other end of the laminated core 72, with the inside diameter of the laminated core 72 increasing in size in the process. In the prestressed state, the laminated core 72 can be mounted on the support 70 of the rotor 76 and be fixed in its position on the support 70 by relaxing the laminated core 71. In this case, the laminated core 72 rests on the circular outer contour of the support 70 without play. In order to form the laminated core 72 to form a rigid structure on the rotor 76, the adjoining turns of the sheet metal strip can be connected to one another, for example, by individual weld points on the laminated core 72. However, it is also feasible to provide the sheet metal strip of the laminated core 72 with baked enamel and to heat the rotor 76 together with the mounted laminated core 72, so that the individual turns of the laminated core 72 fuse due to the baked enamel so as to form a strong structure.

A plurality of permanent magnets 71 is arranged on the laminated core 72, said permanent magnets being fixed in segments to the support 70, for example by way of their lower face, for example by adhesive bonding. Alloys are used in order to produce permanent magnets 71, said alloys containing, for example, iron, nickel or cobalt and it being possible for said alloys to be provided with additives. The materials are, for example, sintered and then magnetized by external magnetic fields. The laminated core 72 which is arranged beneath the permanent magnets 71 ensures the magnetic return path of the permanent magnets 71. The permanent magnets 71 have, by way of example, a substantially rectangular cross section, with the upper face and lower face being ring-like, with the center of the ring lying on the longitudinal axis or the rotor axis of the rotor 76. The permanent magnets 71 are arranged within the rotor 76 such that their surfaces cover individual regular sections in a concentric circle around the rotor axis.

It goes without saying that a person skilled in the art is familiar with the possibility that the invention is not restricted to the illustrated exemplary embodiments. Instead, the laminated core which is produced from a wound sheet metal strip can be used anywhere in an electrical machine where disklike, hollow-cylindrical metal sheets or laminated cores have been used to date in order to conduct the magnetic flux within the electrical machine.

The invention claimed is:

1. An electrical machine having a rotor (8) and a stator (9), with the stator (9) having a winding (12) and at least one laminated core (2; 11) with a substantially rectangular cross section, characterized in that the laminated core (2; 11) has a sheet metal shaped strip (1), with the sheet metal shaped strip (1) being wound in the form of a coil, and that the stator has a support (15, 17) including separate first and second portions arranged radially within the winding (12) of the stator and positioned along an axis of the stator, wherein the first and second portions of the support (15, 17) have opposing faces with inter-engaging and alternating axially recessed portions and axially raised portions wherein the support has at least one receptacle (16) defined within the first and second portions of the support (15, 17), and with the prestress of the wound sheet metal shaped strip of the laminated core (2; 11) being set such that the laminated core (2; 11) is arranged in the receptacle of the support (15, 17) of the stator without play.

2. The electrical machine as claimed in claim 1, characterized in that the sheet metal shaped strip (1) is composed of flat wire.

3. The electrical machine as claimed in claim 1, characterized in that the laminated core (2; 11) is produced from a single piece of the sheet metal shaped strip.

4. The electrical machine as claimed in claim 1, characterized in that the sheet metal shaped strip (1) of the laminated core (2; 11) is connected in the axial direction at least partially by means of baked enamel or by means of a weld connection.

5. The electrical machine as claimed in claim 1, characterized in that the sheet metal shaped strip (1) comprises a soft-magnetic material.

6. A method for producing a laminated core (2; 11) for a stator (9) of an electrical machine, characterized by the steps of:

winding a sheet metal shaped strip (1), prestressing the wound sheet metal shaped strip (1) of the laminated core (2; 11) by twisting one end of the sheet metal shaped strip (1) about a longitudinal axis of the laminated core (2; 11) in relation to the other end of the sheet metal shaped strip (1), inserting the prestressed sheet metal shaped strip (1) of the laminated core (2; 11) into the electrical machine, and relaxing the wound sheet metal shaped strip (1) of the laminated core (2; 11), as a result of which the laminated core (2; 11) bears against a receptacle (16) defined within first and second portions of a support (15, 17) having opposing faces with inter-engaging and alternating axially recessed and axially raised portions, the support (15, 17) being arranged radially within a winding (12) of the stator and positioned along an axis of the stator of the electrical machine.

7. The method as claimed in claim 6, characterized in that the electrical machine is at least partially heated after the laminated core (2; 11) is inserted into the electrical machine, in order to adhesively connect adjoining regions of the laminated core (2; 11) to one another.

8. The method as claimed in claim 6, characterized in that the sheet metal shaped strip (1) of the laminated core (2; 11) is at least partially welded.

9. The method as claimed in claim 6, characterized in that the sheet metal shaped strip (1) has soft-magnetic properties.

10. The electrical machine as claimed in claim 6, characterized in that the laminated core (2; 11) is produced from a single piece of the sheet metal shaped strip.

11. The electrical machine as claimed in claim 10, characterized in that the prestress of the wound sheet metal shaped strip of the laminated core (2; 11) is set such that the laminated core (2; 11) is arranged in the receptacle of the support (15, 17) of the stator without play.

12. The electrical machine as claimed in claim 11, characterized in that the sheet metal shaped strip (1) of the laminated core (2; 11) is connected in the axial direction at least partially by means of baked enamel or by means of a weld connection.

13. The electrical machine as claimed in claim 12, characterized in that the sheet metal shaped strip (1) comprises a soft-magnetic material.

* * * * *